UNITED STATES PATENT OFFICE.

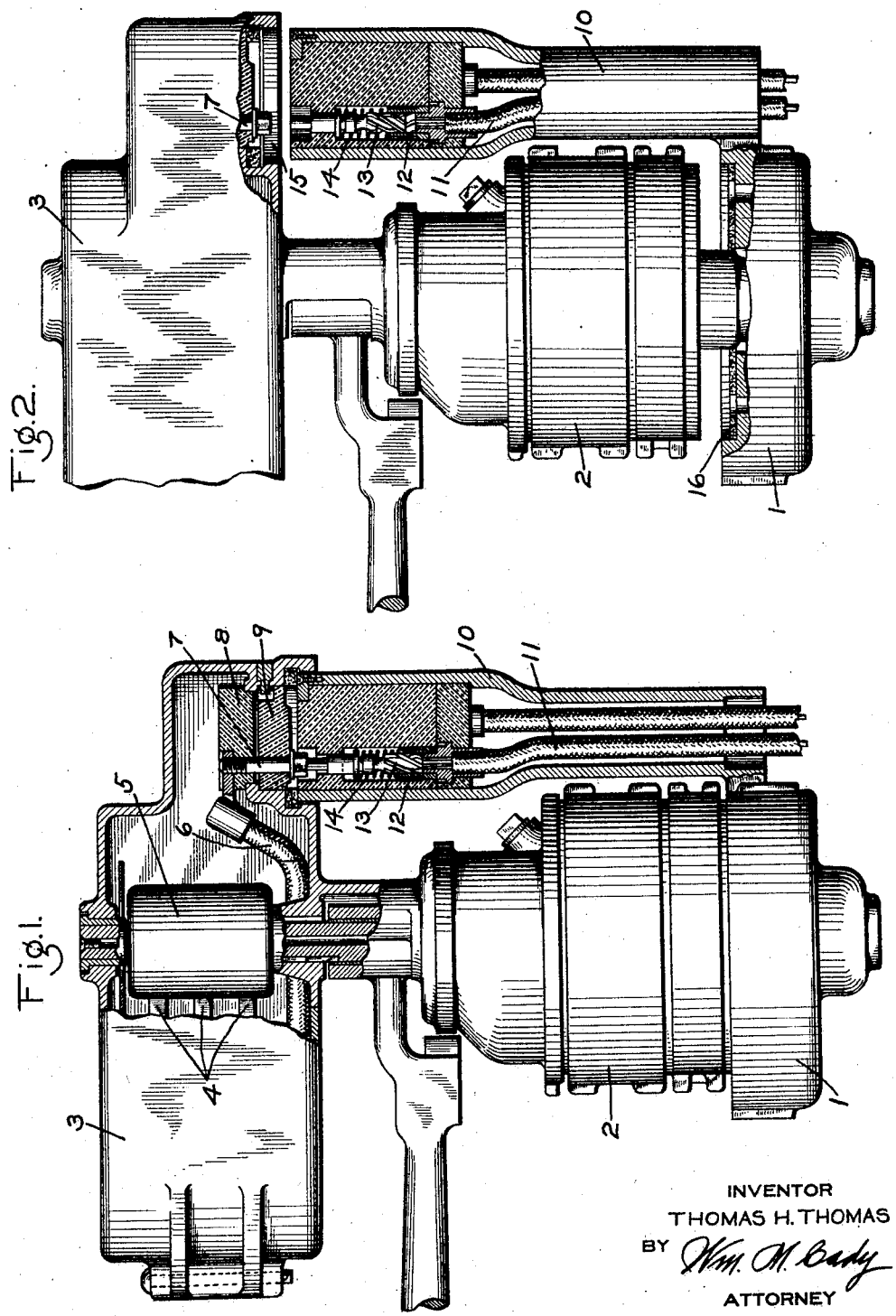

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

COMBINED BRAKE VALVE AND SWITCH.

1,397,563.  Specification of Letters Patent.  Patented Nov. 22, 1921.

Application filed January 20, 1921. Serial No. 438,799.

*To all whom it may concern:*

Be it known that I, THOMAS H. THOMAS, a citizen of the United States, residing at Edgewood, in the county of Allegheny and State of Pennsylvania, have invented new and useful Improvements in Combined Brake Valves and Switches, of which the following is a specification.

This invention relates to a combined brake valve and brake switch adapted more particularly for controlling electro-pneumatic brakes.

Brake valves for fluid pressure brake systems have heretofore been constructed with a pipe bracket to which pipes leading to the brake valve are connected and a main brake valve section which is secured to the pipe bracket, so that the brake valve section may be removed for inspection and repairs without disturbing the pipe connections.

The principal object of my invention is to provide a combined brake valve and brake switch in which the main brake valve section and the brake switch section may be removed without detaching any of the wires connected to the brake switch.

In the accompanying drawing; Figure 1 is an elevational view, partly in section, of a combined brake valve and brake switch, with my improvement applied thereto; and Fig. 2 a similar view, but showing the brake valve and brake switch partly detached from the pipe bracket.

As shown in the drawing, the combined brake valve and brake switch may comprise a pipe bracket 1, a main brake valve section 2, having attached thereto a brake switch portion 3.

In the brake switch portion 3 is provided the usual switch drum 5 having members 4 adapted to engage fingers in a brake switch. One or more wires 6 leading to the fingers in the brake switch have their terminals each connected to a contact bolt 7, secured in position through sections of insulation 8 and 9.

Secured to the pipe bracket 1 is a wire bracket 10, in which are secured the terminals of one or more wires 11, corresponding with each brake switch wire 6.

The terminal of each wire 11 is connected to a socket 12 having spiral grooves for receiving a threaded contact member 13. The contact member 13 is subject to the pressure of a spring 14.

The upper end of each contact member 13 is adapted to engage a corresponding bolt 7 of the brake switch portion 3 when the parts are assembled.

The upper end of the wire bracket 10 is adapted to engage in a recess 15 formed in the brake switch portion 3, and when the combined brake valve and brake switch is applied to the combined pipe and wire bracket, each contact bolt 7 engages the corresponding contact member 13 and presses the same downwardly against the resistance of spring 14, the member 13 being given a rotary movement through the movement of the screw threads thereon in the spiral grooves of the socket 12.

This rotative movement tends to maintain the contact faces of the bolt 7 and the member 13 clean and bright.

The main brake valve section 2 is brought to seat on the usual gasket 16 when the parts are assembled and is secured in position by the usual studs.

By means of the above described construction, the combined brake valve and switch may be removed from the pipe and wire bracket without disturbing or disconnecting any pipe or wire connections.

Having now described my invention, what I claim as new and desire to secure by Letters Patent, is:—

1. A combined brake valve and brake switch device comprising a main brake valve and brake switch portion having a contact connected to a wire leading to the brake switch and a bracket portion for receiving the main portion and having a contact adapted to engage the contact in the main portion upon assembling the parts.

2. A combined brake valve and brake switch device comprising a main brake valve and brake switch portion having contacts connected to wires leading to the brake switch and a pipe bracket portion for receiving the main portion and having contacts adapted to engage the contacts in the main portion when the main portion is applied to the bracket portion.

3. A combined brake valve and brake switch device comprising a main brake valve and brake switch portion having contacts connected to wires leading to the brake switch, a pipe and wire bracket portion, and yielding contacts mounted in the pipe and wire bracket portion and adapted to engage the contacts in the main portion when the main portion is applied to the bracket portion.

In testimony whereof I have hereunto set my hand.

THOMAS H. THOMAS.